United States Patent
Drochon et al.

(10) Patent No.: US 8,434,552 B2
(45) Date of Patent: May 7, 2013

(54) SQUEEZE COMPOSITION FOR RESTORING ISOLATION

(75) Inventors: Bruno Drochon, Cambridge (GB); Simon James, Le Plessis-Robinson (FR); Sylvaine Le Roy-Delage, Paris (FR); Clara Carelli, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 346 days.

(21) Appl. No.: 12/747,554

(22) PCT Filed: Dec. 11, 2008

(86) PCT No.: PCT/EP2008/067352
§ 371 (c)(1),
(2), (4) Date: Aug. 25, 2010

(87) PCT Pub. No.: WO2009/074658
PCT Pub. Date: Jun. 18, 2009

(65) Prior Publication Data
US 2010/0307750 A1   Dec. 9, 2010

(30) Foreign Application Priority Data
Dec. 12, 2007 (EP) ..................................... 07291511

(51) Int. Cl.
*E21B 33/13* (2006.01)
*C09K 8/42* (2006.01)

(52) U.S. Cl.
USPC ........................... 166/293; 166/300; 523/130

(58) Field of Classification Search ........................ None
See application file for complete search history.

(56) References Cited

U.S. PATENT DOCUMENTS

| | | | |
|---|---|---|---|
| 3,743,613 A | 7/1973 | Coulter, Jr. et al. | |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,238,064 A | 8/1993 | Dahl et al. | |
| 5,518,996 A | 5/1996 | Maroy et al. | |
| 6,312,515 B1 | 11/2001 | Barlet-Gouedard et al. | |
| 6,656,266 B1 | 12/2003 | Barlet-Gouedard et al. | |
| 2005/0080176 A1* | 4/2005 | Robb ............................ | 524/424 |
| 2006/0122071 A1 | 6/2006 | Reddy et al. | |
| 2006/0234871 A1 | 10/2006 | Dalrymple et al. | |
| 2007/0187098 A1 | 8/2007 | Putzig | |

* cited by examiner

*Primary Examiner* — Zakiya W Bates
(74) *Attorney, Agent, or Firm* — Michael Dae

(57) ABSTRACT

Compositions containing an alkali swelling polymer and a pH buffer with a pH between 3 and 7 may be used to treat a wellbore. The pH buffer prevents the swelling of the alkali swellable polymer. The compositions may be placed in the wellbore, whereupon they contact another material with pH increasing properties. The pH of the compositions increases, causing the compositions to swell and form a seal. The alkali swelling polymer may be an alkali swelling latex.

17 Claims, 6 Drawing Sheets

SQUEEZE COMPOSITION FOR RESTORING ISOLATION

FIELD OF THE INVENTION

The present invention broadly relates to well cementing. More particularly the invention relates to sealant compositions comprising alkali swellable latex as well as methods for using such compositions to service a wellbore.

DESCRIPTION OF THE PRIOR ART

When a well such as an oil or gas well has been drilled, it is often desired to isolate the various producing zones from each other or from the well itself in order to stabilize the well or prevent fluid communication between the zones or shut off unwanted fluid production such as water. This isolation is typically achieved by installing a tubular casing in the well and filling the annulus between the outside of the casing and the wall of the well (the formation) with cement. The cement is usually placed in the annulus by pumping slurry of the cement down the casing such that it exits at the bottom of the well and passes back up the outside of the casing to fill the annulus. Subsequent secondary cementing operations may also be performed. One example of a secondary cementing operation is squeeze cementing whereby a cement slurry is employed to plug and seal off undesirable flow passages in the cement sheath and/or the casing.

The use of micro-cement slurries to block and repair the unwanted passage of fluids through very small undesirable openings is well known (for example U.S. Pat. No. 5,127,473; U.S. Pat. No. 5,123,487; U.S. Pat. No. 5,238,064; U.S. Pat. No. 5,121,795; U.S. Pat. No. 5,125,455). It is thought the success of squeezing cement into such holes and cracks is mainly a function of the size of the hole relative to the particle size of the cement as well as the properties of the slurries. Also, some cement particle size distributions were defined and claimed for such applications. In addition the usual well cementing additives can be combined with the micro-cement to adjust the slurry properties (accelerator/retarder, thinner (dispersant), fluid-loss control additive, defoaming agents, silica flour, lightweight additives).

While a cement slurry is one type of sealant composition used in primary and secondary cementing operations, other non-cement containing sealant compositions, e.g. geopolymers, may also be employed. Latex emulsions, which contain a stable water-insoluble, polymeric colloidal suspension in an aqueous solution, are commonly used in sealant compositions to improve the properties of those compositions. For example, latex emulsions are used in cement compositions to reduce the loss of fluid there from and to reduce the gas flow potential of the composition as the compositions are being pumped to the annulus. In addition, latex emulsions are used to improve the flexibility of sealant compositions. Drawbacks to using latex emulsions include a lack of sufficient strength and elasticity.

It is difficult to squeeze cement slurry into narrow cracks or channels in the cemented annulus and therefore optimized particle sized distribution cement slurries have been developed to improve injectivity. Squeeze cements as disclosed in U.S. Pat. Nos. 6,312,515 and 6,656,266 are commonly used to seal narrow channels where conventional micro-fine cement slurries cannot penetrate. However, the size of channels that can be penetrated by squeeze cements is limited to approximately 5-7 times the size of the microcement particle size that is a channel width of around 80-100 microns. Therefore, a solution to squeeze fissures having a smaller size is needed.

SUMMARY OF THE INVENTION

The invention provides a method of treating a wellbore, comprising the step of mixing an alkali swellable polymer and a first material, wherein said first material does not cause said alkali swellable polymer to swell significantly; and placing said alkali swellable polymer and said first material in the wellbore. Preferably, the alkali swellable polymer is an alkali swellable latex. Preferably, the first material is a pH buffer material causing the alkali swellable polymer not to set by maintaining the pH below a threshold. The pH buffer material contains preferably a pH decreasing material having pH decreasing properties. The pH threshold is advantageously 4, 5, 6, 7 or 8.

In another embodiment, the alkali swellable polymer is further combined with a second material, said second material having pH increasing material. By coupling effect of pH increasing material and pH decreasing material it is possible to control setting of the alkali swellable polymer. In this way, fracture or cracks located deeper can be treated.

In a first embodiment, the wellbore comprises a first sealant composition set herewith having pH increasing properties and wherein the step of placing the alkali swellable polymer and the first material is done in the vicinity of said first sealant composition to form a second set sealant composition. In this way, the alkali swellable polymer is used as a squeeze composition for restoring isolation of for example a first sealant composition which was damaged. By way of examples, the first sealant composition is cement or geopolymer.

In a further step, a third sealant composition is placed in the wellbore in the vicinity of the first sealant composition to form a third set sealant composition before the step of placing the alkali swellable polymer and the first material. In an alternative step, a third sealant composition is placed in the wellbore in the vicinity of the second sealant composition to form a third set sealant composition after the step of placing the alkali swellable polymer and the first material. By way of examples, the third sealant composition is squeeze cement, microcement and geopolymer or another type of alkali swellable polymer. In this way, combination of the alkali swellable polymer and the third sealant are used as squeeze compositions for restoring isolation of for example a first sealant composition which was damaged.

The method can further comprise the step of placing a third material in the wellbore before the step of placing the alkali swellable polymer and the first material in the wellbore. By way of examples the third material can be a pre-flush of buffer material or other fluid (e.g. normal latex) to delay the reaction with the first sealant composition having pH increasing properties.

In a second embodiment, the alkali swellable polymer forms a second set sealant composition and the method comprising further the step of placing a first sealant composition in the wellbore in the vicinity of said second sealant composition to form a first set sealant composition. By way of examples, the first sealant composition can be squeeze cement or microcement and geopolymer. In a further step, a third sealant composition is placed in the wellbore in the vicinity of the first sealant composition to form a third set sealant composition.

The step of placing an alkali swellable polymer may be done with a downhole tool lowered within the wellbore. As well, the third sealant composition can be placed with such or similar tool. When the well comprises a casing, the method can further comprises the step of forming a hole in the casing before the step of placing an alkali swellable polymer through the hole.

As well, the step of placing an alkali swellable polymer may be done by pumping it from surface.

According to another aspect of the invention, it is disclosed a sealant composition for use in a wellbore comprising: an alkali swellable polymer and a first material, wherein said first material does not cause said alkali swellable polymer to swell significantly. Preferably, the first material is a pH buffer material causing the alkali swellable polymer not to set by maintaining the pH below a threshold. The pH of the pH buffer material is preferably between 3 to 8, more preferably between 3 to 7 and most preferably between 4 to 7. Preferably, the alkali swellable polymer is an alkali swellable latex.

The sealant composition can further comprise particles having an average equivalent diameter of less than 40 microns, wherein said particles do not degrade significantly in the well. Preferably, the particles have an average equivalent diameter of less than 20 microns and more preferably of less than 10 microns. Those particles have an impact on the resistant properties of the set sealant composition. By way of examples, the alkali swellable polymer can also contain other latexes or nanorubber or nanosilica to optimize the properties of the repairing sealant made of alkali swellable polymer.

According to another aspect of the invention, it is disclosed a method of treating a wellbore, wherein the wellbore comprises a first sealant composition set herewith having pH increasing properties and wherein the method comprises the step of placing an alkali swellable polymer in the wellbore in the vicinity of said first sealant composition to form a second sealant composition. Preferably, the alkali swellable polymer is an alkali swellable latex.

Preferably, the alkali swellable polymer is further combined with a pH buffer material. In one embodiment, the pH buffer material has pH increasing properties for the alkali swellable polymer and in another embodiment (not exclusive); the pH buffer material has pH decreasing properties for the alkali swellable polymer.

BRIEF DESCRIPTION OF THE DRAWINGS

Further embodiments of the present invention can be understood with the appended drawings.

DETAILED DESCRIPTION

The widely used non-associative synthetics thickeners are known under the name of alkali swellable (or soluble) emulsion (ASE). Addition of alkali to the polymer emulsion results in neutralization of the carboxylic acid groups, generating an anionic charge at the acid sites along the polymer chain. The like charges repel one another resulting in swelling and uncoiling of the polymer. This extremely large increase in the hydrodynamic volume of the neutralized ASE polymer, versus the same polymer in its emulsion state, is responsible for a significant build in compound viscosity, at relatively low polymer concentration. Aqueous swellable emulsions are high molecular weight polymers. They are liquid products generally commercialized at low concentration of 25-30% of dry matter, easily soluble, and pH dependent, able to provide excellent low-shear rate viscosity, gel structure, sag resistance and stability on time; and increasing yield value, settling and sag resistance, resistance to viscosity drop when diluting, microbial attack.

Alkali swellable emulsion rheology modifiers are often based on homopolymers of (meth)acrylic acid and copolymers of (meth)acrylic acid, (meth)acrylate esters, and maleic acid, among many others, Table 1 is a view of ASE chemistry.

TABLE 1

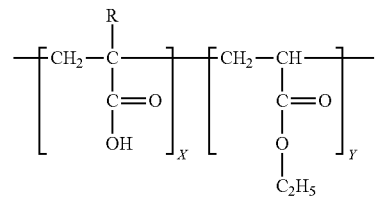

(R = CH$_2$ or OH)

Also hydrophobically modified alkali swellable emulsions (HASE) exist e.g. Akcogum SL920.

Figure 1:
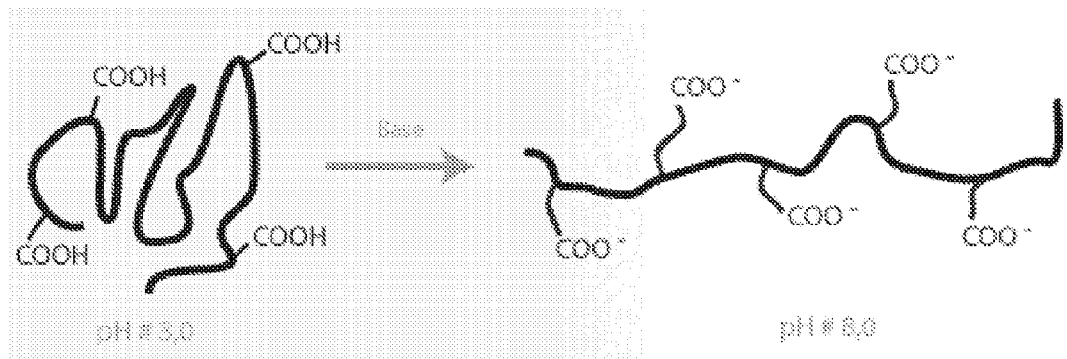
FIG. 1 is a schematic diagram of the thickening mechanism of the alkali swellable emulsions according to the invention.

FIG. 1 is a schematic diagram of the thickening mechanism. Preferably, the alkali swellable polymers are based on latexes: alkali swellable latex (ASL). They are designed with a well-controlled particle size distribution (typically <200 nanometers) that allows it to have low viscosity at high solids concentration. The very low viscosity and small particle size allows a high injectivity through small features. The high solid content will provide high gel strength when swelled at high pH. Without limitation, examples of suitable commercially available alkali swellable latexes include TYCHEM 68710-00 of Dow chemical; ACRYSOL U 615 of Rohm and Hans; SN THICKENERs 920, 922, 924, 634 and 636 of San Napco Limited, Sanyo Chemical Industry, Japan; ALCOGUM SL-120, SL920 of Alco Chemical, a National Starch Company; HEUR-ASE P206 of Dow Chemical Company; ADCOTE 37-220 of Robin and Haas Company; and JETSIZE AE-75 of Eka Chemicals. TYCHEM 68710 is a carboxylated styrene/butadiene copolymer supplied as a ~35% by weight aqueous emulsion; VISCALEX HV30 of Ciba Specialty Chemicals.

Current invention is made to be used in a wellbore of the type oil, gas, water including geothermal wells but also carbon dioxide storing wells or injection wells. Such wells comprise as said a first sealant composition, which for example is a cement, a geopolymer, or a mixture that can viscosify in wellbore zones where a fluid (e.g., drilling fluid) is being lost. For instance, the sealant composition may viscosify in a loss-circulation zone and thereby restore circulation. The viscosified mixture can set into a flexible, resilient and tough material, which may prevent further fluid losses when circulation is resumed. Said first sealant composition has pH increasing properties, i.e. a compound capable of increasing the pH of the first sealant composition to about 7 or higher.

According to the method of the invention, the alkali swellable polymer preferably an alkali swellable latex and a pH buffer material having pH decreasing properties for the alkali swellable polymer is placed in the wellbore. The alkali swellable polymer can also contain other latexes or nanorubber or nanosilica.

The pH buffer material having pH decreasing properties is made of acid-producing material which includes any compound capable of generating hydrogen ions ($H^+$) in water to react with or neutralize a base to from a salt. Examples of suitable acid-producing materials include without limitation organic acids as e.g. citric acid, acetic acid, formic acid, mineral acids as e.g. carbonic acid, partially neutralized salts e.g. $K_2HPO_4$, $KH_2PO_4$ . . . .

The pH buffer material can also have pH increasing properties. In instance, the pH buffer material is made of a base-producing material which includes any compound capable of generating hydroxyl ions ($OH^-$) in water to react with or neutralize an acid to from a salt. Examples of suitable base-producing materials include without limitation ammonium, alkali and alkali earth metal carbonates and bicarbonates, alkali and alkali earth metal hydroxides, alkali and alkali earth metal oxides, alkali and alkali earth metal phosphates and hydrogen phosphates, alkali and alkaline earth metal sulphides, alkali and alkaline earth metal salts of silicates and aluminates, water soluble or water dispersible organic amines, polymeric amines, amino alcohols, or combinations thereof.

Preferably, said base-producing material can be encapsulated with at least one encapsulating material. The base-producing compound may be encapsulated to delay its reaction with the alkali swellable polymer and to postpone the formation of a higher viscosity swollen polymer product. It is to be understood that the base-producing material can be a liquid for example an aqueous solution or an organic liquid, or a solid. If the base-producing material comprises an aqueous solution, it may be encapsulated in a particulate porous solid material. The particulate porous solid material comprises any suitable material that remains dry and free flowing after absorbing the aqueous solution and through which the aqueous solution slowly diffuses. Examples of particulate porous solid materials include but are not limited to diatomaceous earth, zeolites, silica, expanded perlite, alumina, metal salts of alumino-silicates, clays, hydrotalcite, styrene divinylbenzene based materials, cross-linked polyalkylacrylate esters, cross-linked modified starches, natural and synthetic hollow fibers, porous beads such as perlite beads, or combinations thereof. If the base producing material is an organic liquid, it may also be encapsulated in hydrophobically modified porous silica in addition to the afore-mentioned absorbents.

In another embodiment, the acid-producing material can also be encapsulated with at least one encapsulating material as disclosed above.

In alternative embodiments, encapsulation further includes an external coating of a polymer material through which an aqueous solution diffuses and that is placed on the particulate porous solid material. The external coating can be added to further delay the reaction. Examples of external coatings include but are not limited to EDPM rubber, polyvinyldiehioride, nylon, waxes, polyurethanes, cross-linked partially hydrolyzed acrylics, cross-linked latex, styrene-butadiene rubber, cross-linked polyurethane and combinations thereof.

In other embodiments, when the acid or base-producing compound comprises a solid, it can be encapsulated by spray coating a variety of materials thereon, including but not limited to a wax, a drying oil such as tung oil and linseed oil, a polyurethane, a crosslinked partially hydrolyzed polyacrylic, a styrene-butadiene latex, a water degradable compound or polymer, or combinations thereof.

Preferred alkali swellable polymer and alkali swellable latex were disclosed above. In other embodiments, the alkali swellable latex may contain crosslinking agents that are suitable for facilitating the formation of a resilient rubbery mass, which may be used during the polymerization stage of the monomers or added to the latex prior to use (for example to the sealant composition).

In a first embodiment, the wellbore comprises a first sealant composition preferably a hydraulic cement or geopolymer set herewith having pH increasing properties (intrinsically or by adding pH increasing material). The alkali swellable polymer is placed in the vicinity of said first sealant composition to form a second sealant composition. By in the vicinity of, it is understood that the alkali swellable polymer and the first sealant composition are put in contact. It is believed that the pH increasing material embodied with the first sealant composition reacts with acidic groups in the alkali swellable polymer and thereby increases its viscosity along with that of the resulting second sealant composition.

In a second embodiment, when the alkali swellable polymer preferably an alkali swellable latex is placed to form a second sealant composition, the method further comprise the step of placing a first sealant composition preferably a hydraulic cement or geopolymer to form a first sealant composition set.

In a third embodiment, the wellbore comprises a first sealant composition preferably a hydraulic cement or geopolymer set herewith having pH increasing properties (intrinsically or by adding pH increasing material). A third sealant composition preferably a squeeze cement is placed in the vicinity of said first sealant composition e.g. cement or geopolymer to form a third sealant composition set. After, the alkali swellable polymer is placed in the vicinity of said first and third sealant compositions to form a second sealant composition.

In a fourth embodiment, the wellbore comprises a first sealant composition preferably a hydraulic cement or geopolymer set herewith having pH increasing properties (intrinsically or by adding pH increasing material). The alkali swellable polymer is placed in the vicinity of said first sealant composition to form a second sealant composition. After, a third sealant composition preferably a squeeze cement is placed in the vicinity of said first and second sealant compositions to form a third sealant composition set.

In a fifth embodiment, the method further comprises the step of placing multiple alkali swellable polymer preferably alkali swellable latex to form multiple layers of sealant composition.

According to another method of the invention, the alkali swellable polymer preferably an alkali swellable latex is placed in the wellbore in the vicinity of the first sealant composition to form a second sealant composition. The first sealant component has pH increasing properties e.g. cement. The cement composition can include hydraulic cements. In some embodiments, the hydraulic cements set and harden by reaction with water. The hydraulic cements can be composed of calcium, aluminum, silicon, oxygen, sulfur, or combinations thereof. Without limitation, examples of suitable hydraulic cements include Portland cements (e.g., classes A, C, G, and H Portland cements), pozzolana cements, gypsum cements, phosphate cements, high alumina content cements, silica cements, high alkalinity cements, Magnesia cements, and combinations thereof. Suitable median cement particle sizes are in the 1 to 200 microns range, alternatively 5 to 150 microns, and alternatively 10 to 120 microns range.

In one embodiment, the pH of the second sealant composition is increased at a desired time by using an encapsulated base having a suitable coating composition for delayed release, which may be triggered by conditions such as changes in temperature, mechanical stresses or the chemical makeup of the final downhole mixture. The first sealant composition can further comprise additives for improving or changing its properties. Examples of suitable additives include fluid absorbing materials, particulate materials, superabsorbers, viscosifying agents, non-alkali swellable latexes, or combinations thereof. In an alternative embodiment, the first sealant composition is a compressible sealant composition comprising foaming surfactants and foam stabilizing surfactants.

EXAMPLES

Figure 2:
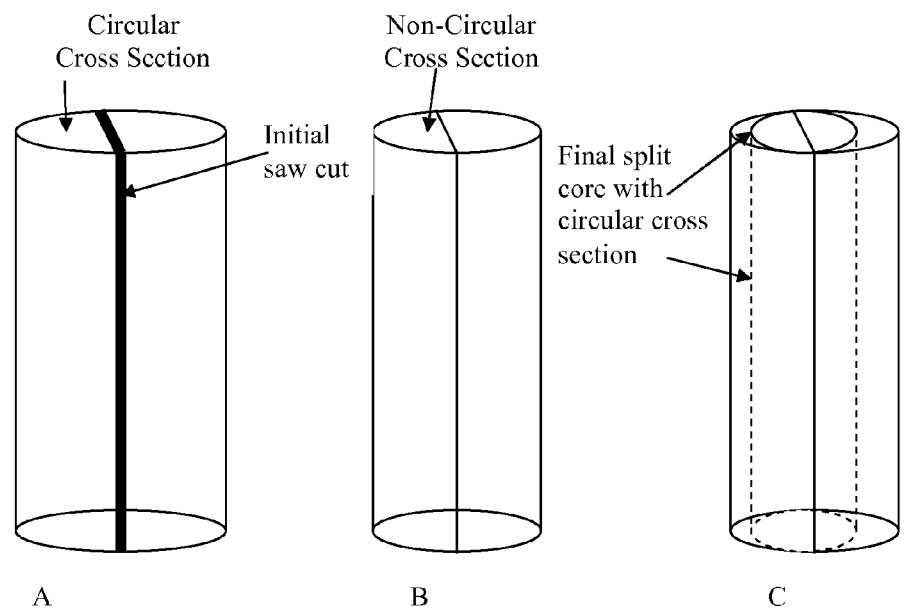
FIG. 2 shows diagram showing the principle of sample preparation for the tests.

Tests were prepared to simulate a fissure in a cement sheath to compare zonal isolation. FIG. 2 shows a diagram of the sample preparation. A conventional 1890 kg/m$^3$ class G cement system was prepared and cured for 3 days at 60° C. in a cylindrical mould. A 37 mm diameter cylinder was then cored from the mould and subsequently cut lengthways (FIG. 2A). The width of the saw cut is approximately 2 mm. The two half cylinders were then placed with their flat faces together (FIG. 2B); the missing width due to the saw cut means that the cross section is now not perfectly circular. The assembly B was embedded in plaster to firmly hold the two pieces together. Once the plaster set a 25 mm diameter core plug was cut from the sample so that the split was in the middle of the resultant core and the cross section of the 25 mm diameter core was perfectly circular (FIG. 2C)—there was no "missing" part due to a saw cut. Two samples were prepared this way with lengths approximately 7 cm.

Figure 3:
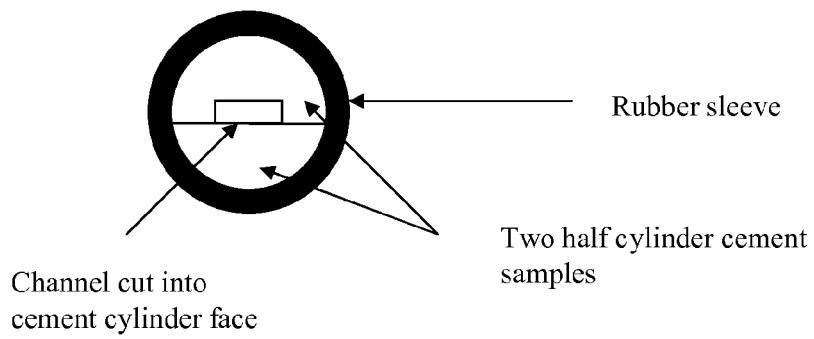
FIG. 3 shows a detail of the test process: end view of the cement cylinder with a channel cut into it.

The test consists of a small slot that is filed into one flat face of one of the cylinders to provide a channel the length of the sample as shown in FIG. 3. The assembly is then inserted in the rubber sleeve of the Hassler cell.

Figure 4:
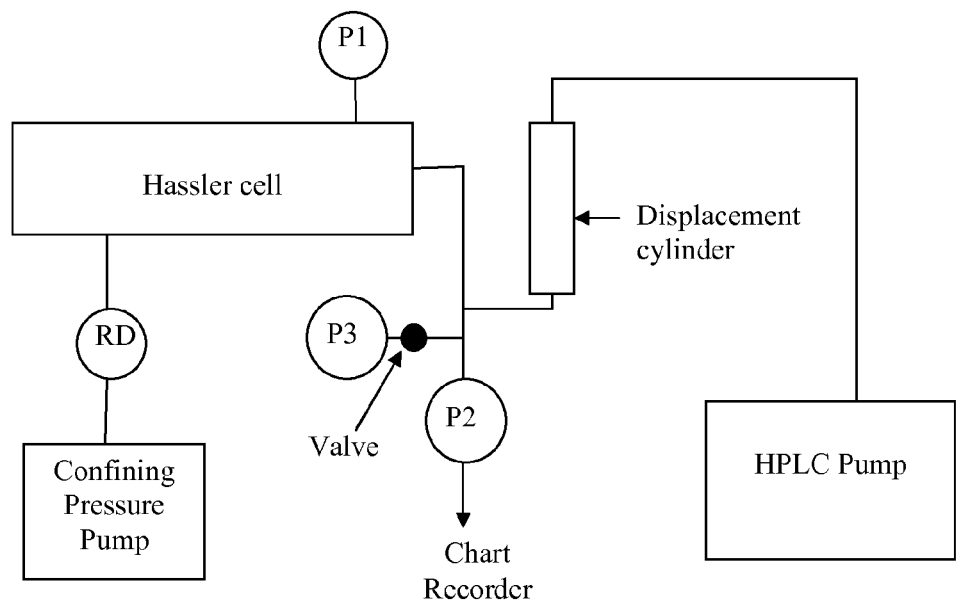
FIG. 4 shows a diagram of the experimental set up.

FIG. 4 shows the equipment setup for the experiment. The pump is a Pharmacia model P-500 HPLC pump. The Hassler cell is from Temco model DCH0-1.0 with a working pressure of 34 MPa. The confining pressure pump is an Ametek Portable Hydraulic Pressure Tester, model T620. P1 is an analogue pressure gauge to give an indication of the confining pressure. P2 and P3 were Validyne pressure transducers with CD23 signal conditioners connected that were connected to a Kipp and Zonen chart recorder. P3 was a 10 psi full scale transducer that could be isolated from the system by a valve when pressures increased. P2 was a 200 psi pressure transducer that could indicate up to 400 psi via the CD23 signal conditioner. The pressure transducers were calibrated against an Ametek Jofra Instruments PPCE pressure calibrator. The displacement cylinder (no reference) was used so that latex would not be pumped through the HPLC pump. When required the cylinder was filled with latex and water pumped into the top by the HPLC pump to displace the latex through the cement sample. The cylinder was bypassed when pumping water only. There would be a little dilution of the latex at the top latex water interface, but the cylinder was never completely emptied so the dilution did not affect the results.

The test procedure was as follows: loading of the test sample into cell; applying 3 MPa confining pressure (this was increased to 6 MPa for some of the tests where high (>1.5 MPa) injection pressures were used; flowing water at different rates and measure pressures; isolating pressure transducer P3 if necessary; adding latex to the displacement cylinder and starting pumping through the core; monitoring pressure; stopping pumping for a given time; restarting pumping and determining maximum pressure obtained; and repeat the pumping-stop-pumping loop several times.

Three lattices were used: TYCHEM 68710-00, a styrene-butadiene latex and ALCOGUM SL920. TYCHEM 68710-00 is a carboxylated styrene-butadiene copolymer latex, TYCHEM 68710-00 is supplied from Dow Chemical. Styrene-butadiene latex is not an ASL and styrene-butadiene latex is supplied from Schlumberger. ALCOGUM SL920 is an alkali-swellable latex (ASL) from Alco Chemical.

Initially water was flowed through the channel to determine the effective height using the equation for flow of a Newtonian fluid through a slot:

$$s = \sqrt[3]{\frac{12\mu LQ}{\Delta P w}} \qquad \text{Equation 1}$$

where: s is the channel height (m); μ is the fluid viscosity (Pa·s); L is the length of the channel (m); Q is the flow rate (m$^3$/s); ΔP is the pressure drop across the sample (Pa); w is the width of the channel (m).

For example 1 the average width of the engraved channel was measured and the average height of the channel calculated from equation 1 and the water flow measurements. With the channel height estimated from water flow, Equation 1 is used to determine the flowing viscosity of latex through the sample. This will give an average viscosity of the flowing fluid as the latex viscosity will depend on the time it has spent in contact with cement. To estimate the yield stress of the fluid on restarting flow the maximum pressure measured multiplied by the channel cross section area was set equal to the yield stress multiplied by the contact area of the channel (top and bottom). The effect of the side walls was ignored. This gives:

$$\text{Yield stress} = \frac{Psw}{2L} \qquad \text{Equation 2}$$

Example 1

The calculated slot height determined from water flow at 3 different rates is shown in Table 2. The estimated slot height is 61 microns as determined from the two highest flow rates. The low flow rate gives a slightly higher slot height but this is due to more significant errors in the pressure measurement at low differential pressures.

TABLE 2

| Flow rate (ml/hr) | Pressure (psi) | Calculated slot height (μm) from equation 1 |
|---|---|---|
| 400 | 6.4 | 61 |
| 200 | 3.2 | 61 |
| 100 | 1.1 | 69 |

Figure 5:
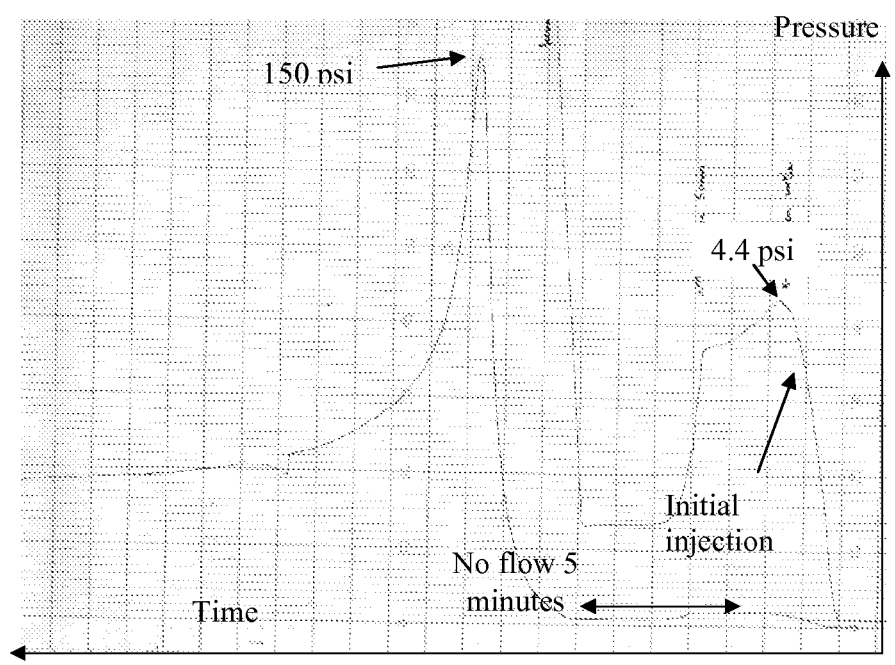
FIG. 5 shows a chart recording of the initial injection of TYCHEM 68710-00 into the slot at 25 mL/hr and the pressure spike on restart of flow after 5 minutes.

Following water injection Tychem 68710-00 was pumped through the channel in the cement cores. The pressure recorded across the sample is shown in FIG. 5—the first curve (left) is the high pressure transducer (1.4 MPa full scale) and the second curve (right) is the low pressure transducer (0.07 MPa full scale). On initial flow the ASL flows into the slot and the first volume is exposed to the clean cement and the consequent pH increase causes the viscosity of the system to increase. The subsequent volumes of ASL are exposed to cement that has already been in contact with latex so the pH increase is lower. The pressure trace shows this with an increase in pressure initially (corresponding to ASL filling the slot) and a subsequent decrease in pressure as the first volume of ASL exits the slot. Flow was not continued long enough for equilibrium to be reached. The flow was stopped for 5 minutes before restarting at 25 mL/hr. A large pressure spike (150 psi) is observed prior to a rapid decrease. During the 5 minute stationary period the pH of the ASL has increased due to prolonged contact with the cement. This has increased the yield stress of the fluid thus requiring a high pressure to initiate flow. However, once the fluid starts to move there is a rapid decrease in pressure as the fluid that has been in contact with the cement is displaced by fresh ASL. At 25 mL/hr the volume of the slot is displaced in 6 seconds. The decrease in pressure takes much longer than this indicating that not all the high pH ASL is displaced but that there is a layer on the walls of the slot that takes some time to remove.

The flow was subsequently stopped for 30 minutes and the pressure spike recorded after restarting flow at 25 mL/hr. This process was repeated a couple of times. The yield stress, calculated from the pressure spike, and the viscosity, calculated from the flowing pressure drop, are shown in Table 3.

TABLE 3

| | Viscosity (mPa·s) | Pressure Peak (MPa) | Yield Stress (Pa) |
|---|---|---|---|
| Initial peak pressure during flow | — | 0.03 | — |
| Restart after 5 minutes stationary | — | 1.0 | 430 |
| Equilibrium flow at 25 mL/hr | 90 | — | — |
| Restart after 30 minutes stationary | — | >1.4 | >570 |
| Equilibrium flow at 25 mL/hr | 100 | — | — |
| Restart after 30 minutes stationary | — | 2.6 | 1100 |

Figure 6:
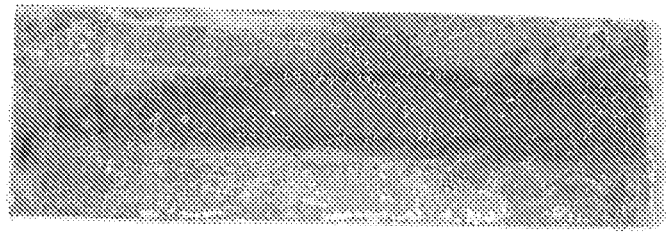
FIG. 6 shows distribution of TYCHEM 68710-00 after separation of the two cement halves (Flow direction from right to left).
Figure 6:
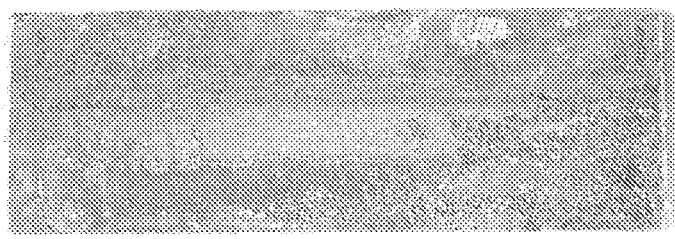

The results show that when the fluid flows its viscosity is low allowing it to penetrate into cracks even when in contact with a high pH material. However, when left stationary for a few minutes the yield stress increases to a high level thus requiring a high pressure to initiate flow. These are characteristics of a system that could be used to repair cracks or other small defects in cement sheaths. The cement system was removed from the Hassler cell and the two parts separated. The distribution of the ASL in the slot is shown in FIG. 6. It is clear that the ASL has flowed through the well defined slot. The distribution of ASL on both halves is complementary.

Figure 7:
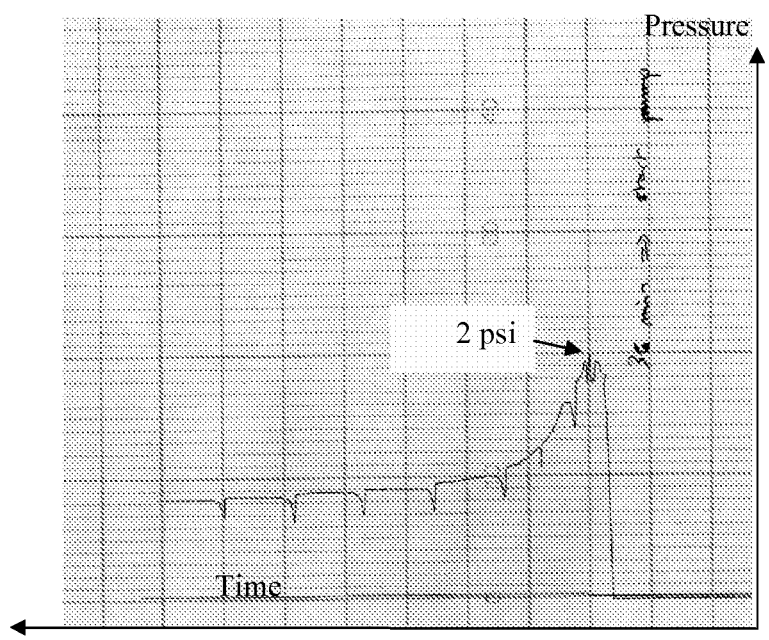
FIG. 7 shows development of pressure with time on restarting flow at 25 mL/hr after styrene-butadiene latex has been left stationary in the slot for 30 minutes.
Figure 8:
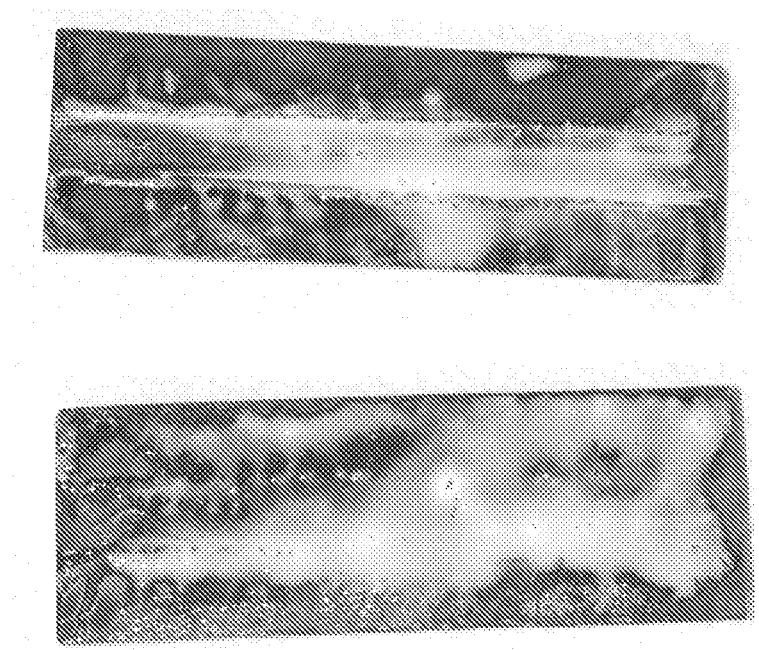
FIG. 8 shows distribution of styrene-butadiene latex after separation of the two cement halves.

The two cement halves were cleaned to remove the ASL and the slot re-engraved to ensure fresh surfaces were available. The calibration measurements were performed with water on the slightly modified slot. The re-engraved slot had an average height of 86 microns. Following calibration of styrene-butadiene latex was injected into the slot as a control measurement. Styrene-butadiene latex is not an alkali-swellable latex so it would not be expected to behave in the same way as an alkali swellable latex. A pressure plot recorded on restarting flow with styrene-butadiene latex after a 36 minute stationary period is shown in FIG. 7. The maximum pressure attained was 0.014 MPa corresponding to a yield stress of 8 Pa. The distribution of the styrene-butadiene latex after removal of the cement plug from the Hassler cell and separation of the two halves is shown in FIG. 8. The styrene-butadiene latex has remained very liquid hence it has covered almost all the core surface, not just the channel.

Alkali swellable lattices can be injected at relatively low pressures into narrow cracks. Micro-cement slurries cannot be injected into cracks 60 microns in width. When stationary and in contact with a substrate at high pH the latex develops a high yield stress. This high yield stress will prevent subsequent migration of fluids through cracks in the cement sheath. Conventional lattices do not show the same behaviour. Alkali swellable lattices can be used as sealants to repair leaks due to narrow channels or cracks in or close to cement sheaths.

Example 2

Example 2 is performed as before except that once prepared the cement sample was stored in water at room temperature for months until the test was performed. This test will simulate the situation in a wellbore after the first sealant has been in place for some time.

The calculated slot height determined from water flow at 4 different rates is shown in Table 4. The estimated slot height is 61 microns as determined from the two highest flow rates. The low flow rate gives a slightly higher slot height but this is due to more significant errors in the pressure measurement at low differential pressures.

TABLE 4

| Flow rate (ml/hr) | Pressure (psi) | Calculated slot height (μm) |
|---|---|---|
| 400 | 9.2 | 55 |
| 300 | 6.9 | 55 |
| 200 | 4.5 | 56 |
| 100 | 2.1 | 57 |

Following water injection Alcogum SL920 was pumped through the channel in the cement cores. The initial flow at 100 mL/hr gave a pressure drop across the sample of 13.9 psi. The flow was stopped for 5 minutes and then restarted at 25 ml/hr. There was no noticeable pressure increase when the flow was restarted. The flow was stopped for 32 minutes before restarting the flow at 25 mL/hr. The pressure built up gradually reaching 200 psi after 26 minutes of flow. The measurement was then stopped as the limit of the pressure transducer was reached.

The Alcogum SL920 could be pumped into a narrow crack with a relatively low injection pressure. Once the product was left stationary for a period of 30 minutes there was sufficient interaction with the cement to cause a significant increase in viscosity. When flow was restarted the pressure built up to 200 psi. The Alcogum was able to block the crack in the cement, but the behaviour was slightly different from the Tychem product; the pressure built up more slowly during injection but the product was able to withstand a higher pressure.

Other tests were realized with two lattices: TYCHEM 6870-00 and VISCALEX HV30. TYCHEM 68710-00 is supplied from Dow Reichold and VISCALEX HV30 is supplied from Ciba Specialty Chemicals. The first one is based on a carboxylated styrene-butadiene copolymer, while the second one is a water dispersion of anionic polyacrylate copolymers. Some of their properties are reported in Table 5.

TABLE 5

|  | TYCHEM 68710-00 | VISCALEX HV30 |
|---|---|---|
| Polymer type | Styrene-butadiene | Acrylate |
| pH | 4.5 | 3 |
| Non Volatile content, % | 34 | 30 |

Example 3

To prove the high injectivity of alkali swellable lattices rheology measurements have been performed at 25 deg C., at 60 deg C. and at 80 deg C. using a standard oilfield viscometer.

Figure 9:
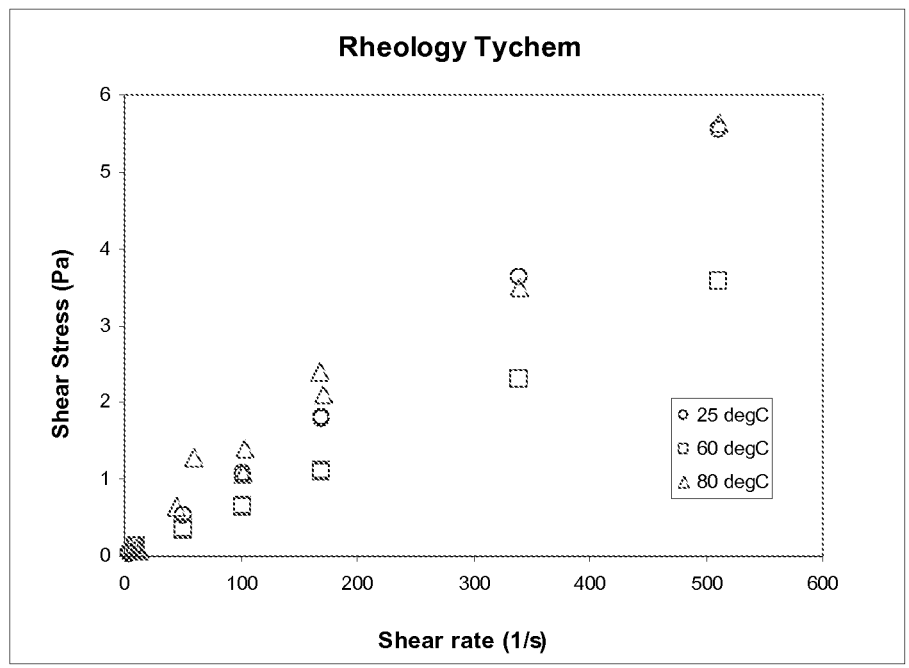
FIG. 9 shows shear stress as a function of the shear rate for TYCHEM 68710-00 for three different temperatures 25 deg C., 60 deg C. and 80 deg C.
Figure 10:
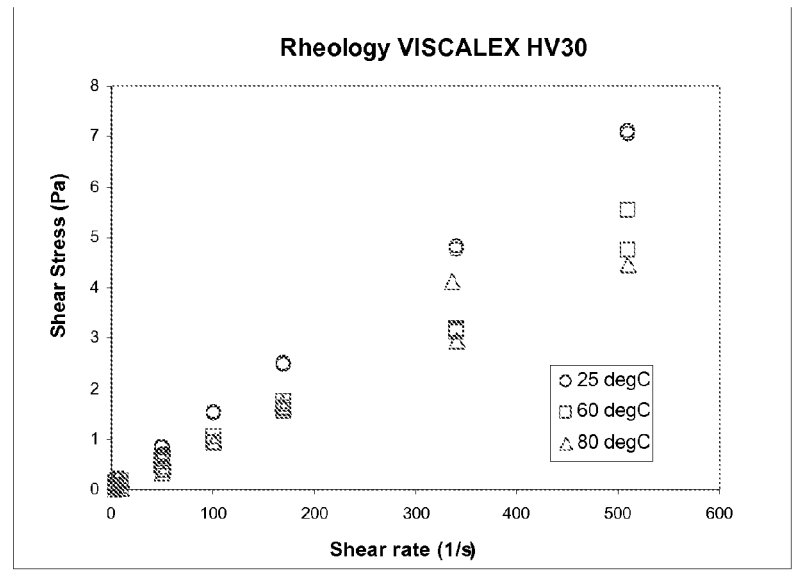
FIG. 10 shows shear stress as a function of the shear rate for VISCALEX HV30 for three different temperatures 25 deg C., 60 deg C. and 80 deg C.

The values of shear stress as a function of shear rate, found for TYCHEM 68710-00, are plotted in FIG. 9, while those obtained for VISCALEX HV30 are represented in FIG. 10. Small differences are observed when the temperature is increased. In Table 6 the plastic viscosity, Pv, and the yield stress, Ty, obtained by applying the Bingham model are reported for different temperatures. The values are considerably lower than those obtained with standard cement systems.

TABLE 6

|  | Temperature | | |
|---|---|---|---|
|  | 25 deg C. | 60 deg C. | 80 deg C. |
| TYCHEM 68710-00 | | | |
| $P_v$ (cP) | 11 | 7 | 11 |
| Ty (lbm/100 ft$^2$) | <2 | <2 | 2.1 |
| VISCALEX HV30 | | | |
| $P_v$ (cP) | 14 | 10 | 9 |
| Ty (lbm/100 ft$^2$) | 3.0 | <2 | 2.7 |

Example 4

Figure 11:
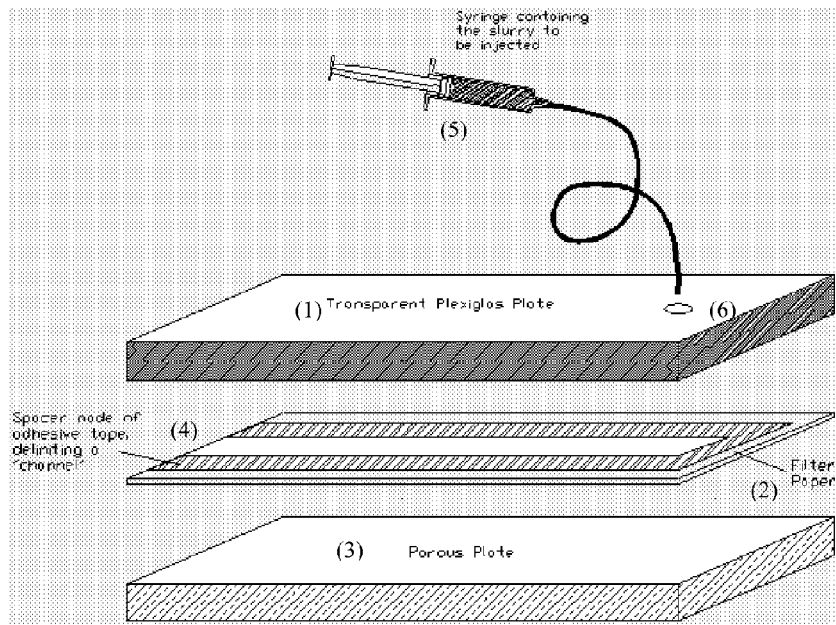
FIG. 11 shows the set-up used for injection tests on examples 5 and 6.

In order to test the ability of ASL based fluids to penetrate in narrow gaps injection tests have been performed by using a special set-up, shown in FIG. 11. This system is composed of a transparent Plexiglas plate (1) placed on a filter paper (2) supported by a porous plate (3). Small clamps, not shown in the figure, are used to hold the plates together. A channel is obtained between the transparent plate and the filter paper by using spacers of well-defined thickness (4). To estimate the ability of the fluids to penetrate in narrow fractures the thickness of the gap can be adjusted. The fluid is injected in the narrow channel with a syringe pump (5) through a hole (6) on the Plexiglas plate. The speed of injection is 5 mL/min. After injection, the distance traveled by the fluid inside the gap is measured to determine its ability to penetrate. The maximum distance, defined by the size of the plates, is 23 cm. All the tests have been performed at room temperature.

Example A

To test the swelling of ASLs in contact with a basic environment the filter paper was wet with solutions of sodium hydroxide to simulate a porous surface with basic pH. For these experiments TYCHEM 68710-00 was used.

When the pH is lower than 12 the ASL swells slowly; it can be injected well in gaps narrower than 60 microns. The length of the channel it can penetrate is >23 cm. When the pH is higher than 12 the ASL swells faster and cannot reach the end of the channel. In a 100 microns gap the ASL travels a distance between 15 cm and 18 cm.

Buffers at different pH have been added to the ASL to retard the swelling and thus favour the penetration in channels with high pH surfaces. In all these experiments the height of the channel was fixed to 100 microns, and the filter paper at the surface of the gap was wet with a solution at pH 13. For these experiments both TYCHEM 68710-00 and VISCALEX HV30 have been used. The results obtained are summarized in Tables 7 and 8.

Example B

Two buffer solutions at pH 7 and pH 5 were prepared by mixing a 0.1M solution of citric acid and a 0.2M solution of $Na_2HPO_4$. The buffer solutions were then added to the ASLs in ratio 10/90 and the fluid obtained was injected in the 100 microns channel. The addition of the pH buffers retards the swelling and the distance that the ASLs can penetrate is increased. For the lower pH buffer the two fluids travel through the whole channel (>23 cm).

Example C

In a different test the buffer solutions at pH 7 or at pH 5 were first injected in the 100 microns channel. Successively the ASL were injected in the gap. The swelling is retarded and the ASLs can reach a longer distance. Again for the lower pH buffer the fluids travel on the total length of the channel.

TABLE 7

| TYCHEM 68710-00 | |
|---|---|
| Fluid composition | Distance traveled |
| 100% Tychem | 15-18 cm |
| 90% Tychem-10% pH 7 Buffer | 21-22 cm |
| 100% Tychem after injecting a pH 7 Buffer | 20 cm |
| 90% Tychem-10% pH 5 Buffer | >23 cm |
| 100% Tychem after injecting a pH 5 Buffer | >23 cm |

TABLE 8

| VISCALEX HV30 | |
|---|---|
| Fluid composition | Distance traveled |
| 100% Viscalex HV30 | 12-14 cm |
| 90% Viscalex HV30-10% pH 7 Buffer | 18-21 cm |
| 90% Viscalex HV30-10% pH 5 Buffer | >23 cm |
| 100% Viscalex HV30 after injecting a pH 5 Buffer | >23 cm |

Example 5

In order to test the possibility to mix the ASLs to different materials, TYCHEM 68710-00 was blended to a styrene-butadiene latex (SB Latex) with particle size lower than 165 nm, non-volatile content 50% and pH 10. The weight ratio between the ASL and the latex was 50/50. Injection tests were conducted with the set-up of FIG. 14. The height of the channel was 100 microns and the filter paper at pH 13.

First the blend was injected without the addition of any pH lowering fluid. The distance traveled was 9 cm. Successively pH buffers or acidic solutions were either injected first or mixed to the blend. The results obtained are shown in Table 9.

When 10% of a solution 0.1M of citric acid was added to the blend the distance reached in the channel was 22 cm. This was increased to more than 23 cm when 10% of buffer solution at pH 5 was added.

TABLE 9

| Blend composition | Distance traveled |
| --- | --- |
| 50% TYCHEM-50% SB Latex | 7-9 cm |
| 50% TYCHEM-50% SB Latex after injecting a pH 7 buffer | 11 cm |
| 50% TYCHEM-50% SB Latex after injecting 0.1M citric acid | 15-18 cm |
| 45% TYCHEM/45% SB Latex/ 10% citric acid 0.1M | 22-23 cm |
| 45% TYCHEM/45% SB Latex/ 10% pH 5 buffer | >23 cm |

Examples 4 and 5 show that the distance that a fluid containing an ASL penetrates in a very narrow channel in contact with a pH increasing material, can be adjusted by making blends with other materials, or by using a pH decreasing material like a pH buffer or an acid solution. This can be mixed to the ASL or injected first in the fracture to retard the swelling of the ASL.

The invention claimed is:

1. A method of treating a wellbore, comprising the step of:
    mixing an alkali swellable polymer and a pH buffer material, wherein the pH buffer material has a pH between 3 and 7 and does not cause said alkali swellable polymer to swell; and
    placing said alkali swellable polymer and said pH buffer material in the wellbore.

2. The method of claim 1, wherein the pH buffer material causes the alkali swellable polymer not to set by maintaining the pH below a threshold.

3. The method of claim 1, wherein the alkali swellable polymer is further combined with a second material, said second material having pH increasing properties.

4. The method according to claim 1, wherein the wellbore comprises a first sealant composition set herewith having pH increasing properties and wherein the step of placing said alkali swellable polymer and said pH buffer is done in the vicinity of said first sealant composition to form a second sealant composition.

5. The method of claim 4, comprising further the step of placing a third sealant composition in the wellbore in the vicinity of said first sealant composition to form a fourth set sealant composition before the step of placing said alkali swellable polymer and said pH buffer.

6. The method of claim 4, comprising further the step of placing a third sealant in the wellbore in the vicinity of said second sealant composition to form a fourth set sealant composition after the step of placing said alkali swellable polymer sand said pH buffer.

7. The method of claim 5 wherein the third sealant composition is squeeze cement or microcement and geopolymer.

8. The method of claim 1, comprising further the step of placing a third material in the wellbore before the step of placing said alkali swellable polymer and said pH buffer in the wellbore.

9. The method according to claim 1, wherein the alkali swellable polymer is an alkali swellable latex.

10. The method of claim 1, wherein the step of placing an alkali swellable polymer is done with a downhole tool lowered within the wellbore.

11. The method of claim 10, wherein the well comprises a casing, and the method further comprises the step of forming a hole in the casing before the step of placing an alkali swellable polymer.

12. The method of claim 1, wherein the step of placing an alkali swellable polymer and the first material is done by pumping said alkali swellable polymer and said first material from surface.

13. A method of treating a wellbore comprising a first set sealant composition comprising squeeze cement, microcement or geopolymers set herewith, comprising:
    mixing an alkali swellable polymer and a pH buffer material whose pH is between 3 and 7, wherein said pH buffer material does not cause said alkali swellable polymer to swell; and
    placing said alkali swellable polymer and said pH buffer material in the vicinity of the first set sealant composition in the wellbore;
    wherein said first set sealant composition has pH increasing properties thus causing the alkali swellable polymer to swell to form a second set sealant composition.

14. A sealant composition for use in a wellbore comprising: an alkali swellable polymer and a pH buffer material whose pH is between 3 and 7, wherein said pH buffer does not cause said alkali swellable polymer to swell.

15. The sealant composition of claim 14, wherein the pH buffer material causes the alkali swellable polymer not to set by maintaining a pH below a threshold.

16. The sealant composition of claim 14 further comprising particles having an average equivalent diameter of less than 20 microns, wherein said particles do not degrade in the well.

17. The sealant composition of claim 14, wherein the alkali swellable polymer is an alkali swellable latex.

* * * * *